(12) United States Patent
Le et al.

(10) Patent No.: US 6,178,644 B1
(45) Date of Patent: Jan. 30, 2001

(54) HOLLOW SHAFT PRUNING ASSEMBLY

(75) Inventors: Thong Huu Le, 1975 Limewood Dr., San Jose, CA (US) 95132; Timothy Van Le, San Jose, CA (US)

(73) Assignee: Thong Huu Le, San Jose, CA (US)

( * ) Notice: Under 35 U.S.C. 154(b), the term of this patent shall be extended for 0 days.

(21) Appl. No.: 09/526,108

(22) Filed: Mar. 15, 2000

Related U.S. Application Data

(63) Continuation of application No. 09/072,123, filed on May 4, 1998, now Pat. No. 6,038,773, which is a continuation-in-part of application No. 08/722,792, filed on Sep. 27, 1996, now Pat. No. 5,745,998, which is a continuation of application No. 08/585,120, filed on Jan. 11, 1996, now abandoned.

(51) Int. Cl.[7] .................................................. B26B 13/26
(52) U.S. Cl. ................................................ 30/249; 30/245
(58) Field of Search ............................. 30/244, 245, 246, 30/249

(56) References Cited

U.S. PATENT DOCUMENTS

| 5,745,998 | * | 5/1998 | Le et al. | 30/249 |
| 5,933,965 | * | 8/1999 | Linden et al. | 30/249 |
| 5,960,546 | * | 10/1999 | Cooke et al. | 30/249 |
| 6,038,773 | * | 3/2000 | Le et al. | 30/249 |

* cited by examiner

*Primary Examiner*—Hwei-Siu Payer
(74) *Attorney, Agent, or Firm*—Edward Dreyfus

(57) ABSTRACT

A pruner assembly having hollow shaft with a longitudinal axis, a lower end, and open upper end, and a handgrip portion slidable along the longitudinal axis between a first and a second position. A shearing mechanism attaches to said open upper end of the hollow shaft, which mechanism includes a body having a hook adapted to receive and hold a limb, a cutting blade pivots on the body and against the hook to cut the limb. An arm member pivots to the body and couples to the blade so that pivotal movement of the arm member pivotally moves the cutting blade. A pulley is mounted to the arm member distal end and a cable guide pulley is coupled to the hollow shaft adjacent the open upper end for guiding a cable into and out of the open upper end without the cable contacting the walls thereof. A cable is provided for moving the cutting blade with respect to the hook. The cable extends in operable engagement with the arm pulley and the guide member pulley, thus forming a two-pulley system for reducing the pull force needed to operate the assembly and cut the limb. The above mentioned pruner design applies to both fixed and adjustable length pruners.

16 Claims, 12 Drawing Sheets

HOLLOW SHAFT PRUNING ASSEMBLY

FIELD OF THE INVENTION

This is a continuation application of U.S. patent application Ser. No. 09/072,123 filed May 4, 1998, now U.S. Pat. No. 6,038,773 which is a continuation-in-part application of U.S. patent application Ser. No. 08/722,792, filed Sep. 27, 1996 now U.S. Pat. No. 5,745,998, issued May 5, 1998, which is a continuation application of U.S. patent application Ser. No. 08/585,120, filed Jan. 11, 1996 now abandoned.

This invention relates to cutting tools, and more particularly, to pruning shears having an extended handle for reaching branches at greater heights, and a cord for remotely activating a shearing mechanism.

BACKGROUND OF THE INVENTION

Conventional tree pruning shears are typically provided with a pole of fixed or adjustable length, a shearing mechanism located at one end of the pole, and an operating cable or cord attached to the shearing mechanism and extending the length of the pole for remote operation of the shearing mechanism.

The conventional shearing mechanism usually includes a capturing hook portion which is adapted to bang from a branch or limb intended to be cut, and a mating pivotal cutting blade. The cutting blade includes a leverage arm from which is attached one end of the operating cord. The pruning shears are manipulated by holding the pole in one hand and the operating cord in the other hand. A limb of interest is "hooked" and held by the hook portion of the shearing mechanism. The operating cord is then pulled which causes the cutting blade to pivot into the "captured" limb. The amount of force required to cut the limb varies, depending on the type of wood, the size of the limb and the location of the cut. However, for the most part, the cutting action requires a great deal of force from its operator.

In addition, generally the operating cord hangs freely outside the pole. During the cutting operation, the operating cord will frequently become snagged on other branches or twigs, reducing the cutting force, and requiring time and effort to untangle the operating cord.

Another technical problem to be solved is related to certain user needs for an extendable pruner, that is one which can be extended and locked into a number of effective operating pruner lengths for a pruner having design benefits as described above.

While these other units may be suitable for the particular purpose for which they were intended, or for general use, they would not be as suitable for the purposes nor include the benefits of the present invention as described herein.

SUMMARY OF THE INVENTION

It is an object of the invention to provide an adjustable length pruner which will effectively cut a branch with minimal effort.

It is another object of the invention to provide an adjustable length pruner in which the possibility of snagging the operating cord is greatly reduced.

It is a further object of the invention that the cutting arm is operated by means of a leverage arm, and the leverage of the cutting arm is greatly increased by the dual-pivotal attachment of the leverage arm and cutting arm.

It is a further object of the present invention to provide a pruner in which the operating cord extends through the interior of the pruner and has a portion operably coupled to a lower longitudinally operating handle of the pruner.

A further object of the present invention is to provide a pruner having an internally extending operating cord as described, which pruner can be extended and secured in a plurality or infinite number of operating pruner lengths.

Yet a further object is to provide a pruner with a shearing mechanism that includes a leverage arm and blade design that produces enormous cutting forces given the longitudinal displacement of the cutting shaft or handle.

A portable pruner for cutting limbs comprises a hollow elongated tube assembly having a longitudinal axis, a lower sliding portion and an upper open end. The sliding portion is telescopically slidable along the longitudinal axis between a first and a second position. A shearing mechanism is attached to the upper open end of the hollow handle and includes a body having a hook adapted to receive and hold a limb. A cutting blade assembly including a leverage arm is pivotally attached to the body and selectively pivots against the hook to cut the selected limb. The pruner includes means for pivoting the cutting blade with respect to the hook wherein the pivoting means is responsive to movement of the sliding portion between the first and second positions.

The upper section of the pruner is tubular. An operating cord extends through the upper open end then through the interior of the tube and has one portion operable by the sliding portion. Another portion of the cord extends beyond the open upper end and operably engages the leverage arm assembly so that longitudinal withdrawal of the sliding portion causes cutting rotation of the leverage arm and cutting blade assembly.

In one exemplary embodiment the upper section or hollow tube has a fixed length.

In another exemplary embodiment, the upper section or hollow tube includes two telescoping segments and an operable clamping or securing device mounted to the outer segment to enable the user to adjust the overall operating pruner length to any desired length within two limits. The device is selectively moveable on one of the two segments and the cord operatively engages the device so that length adjustment of the two segments also accommodates the change in cord length external to the hollow tube. This permits the same, relative operating positions of the handle and hollow tube regardless of the adjusted length of the hollow tube.

Other principal features and advantages of the invention will become apparent to those skilled in the art upon review of the following drawings, the detailed description and the appended claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
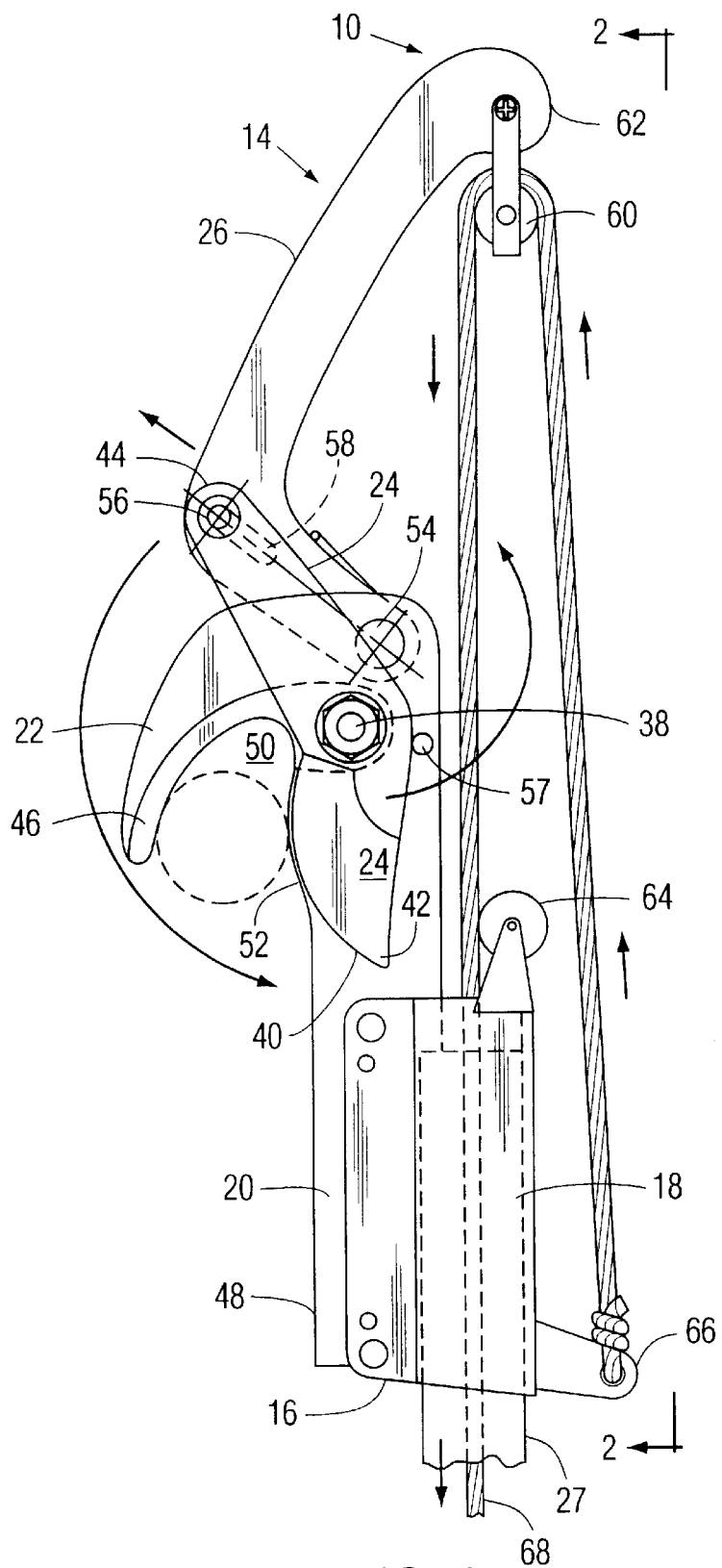
FIG. 1 is a partial front plan view of the pruning shears, showing details of the shearing mechanism located in a receiving position, in accordance with the invention.
Figure 6:
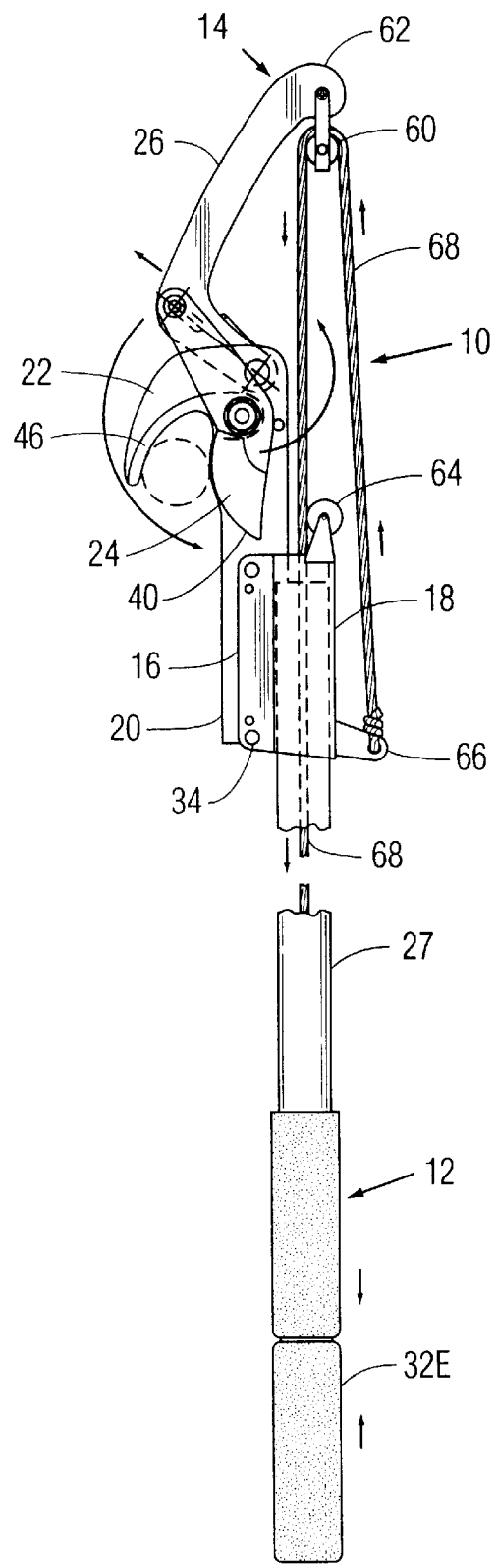
FIG. 6 is a partial plan view of the shearing mechanism and the handle portion, in accordance with the invention.

Referring to FIGS. 1 and 6, a pruning apparatus 10 in accordance with the invention is shown having a handle assembly 12, and a shearing mechanism 14. The shearing mechanism 14 includes a body 16 defining a tube 18 (which is open at both ends), a hook plate 20 having a hook 22, a cutting arm 24, and a leverage arm 26.

Figure 2:
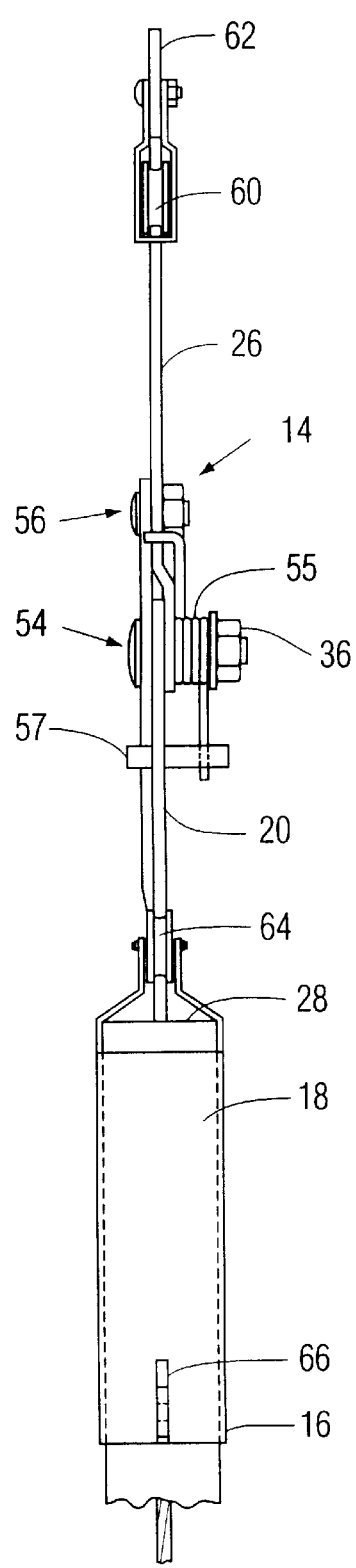
FIG. 2 is a side view of the shearing mechanism of FIG. 1, taken along the lines 2—2 of FIG. 1, in accordance with the invention.
Figure 3:
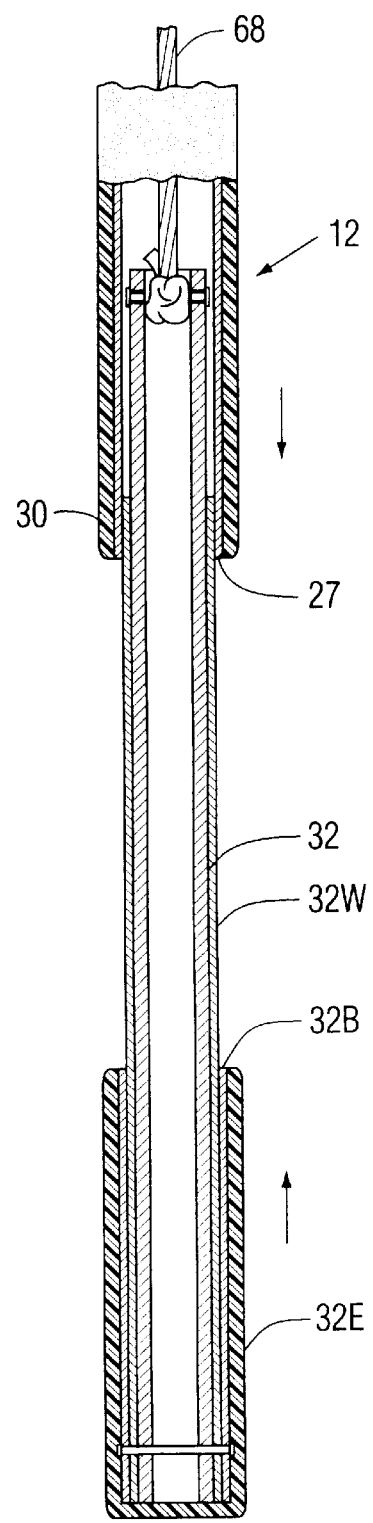
FIG. 3 is a section view of a handle portion, in accordance with the invention.

As shown in FIGS. 2 and 3, the handle assembly 12 includes a hollow shaft 27, defining a longitudinal axis and having an open upper end 28, a lower end 30, and a slidable grip portion 32. An upper foam rubber or plastic hand grip 30 surrounds the lower end of shaft 27. The slidable grip portion 32, further comprises an end foam or plastic hand grip 32E, fully opposite from the shearing mechanism 14, and may comprise a weighted sleeve 32W. The weighted sleeve 32W may be constructed of metal, wherein the majority of the other non-moving, non-cutting parts may be constructed of plastic. The metal components of the shearing mechanism 14 tend to make the pruning apparatus 10 top heavy. Thus, the weighted sleeve 32W helps balance the pruning apparatus 10 by counteracting the weight and rotational moments of shearing mechanism 14. Ideally, the weighted sleeve 32W is weighted so that the shearing mechanism 14 is responsive to the slightest effort by the user at the slidable grip portion 32. Thus, any effort or force expended by the user is translated into cutting power, and increased torque at the cutting blade helps increase the cutting arm 24. In addition, the end grip 32E may itself have an end grip weight 32B.

Figure 4:
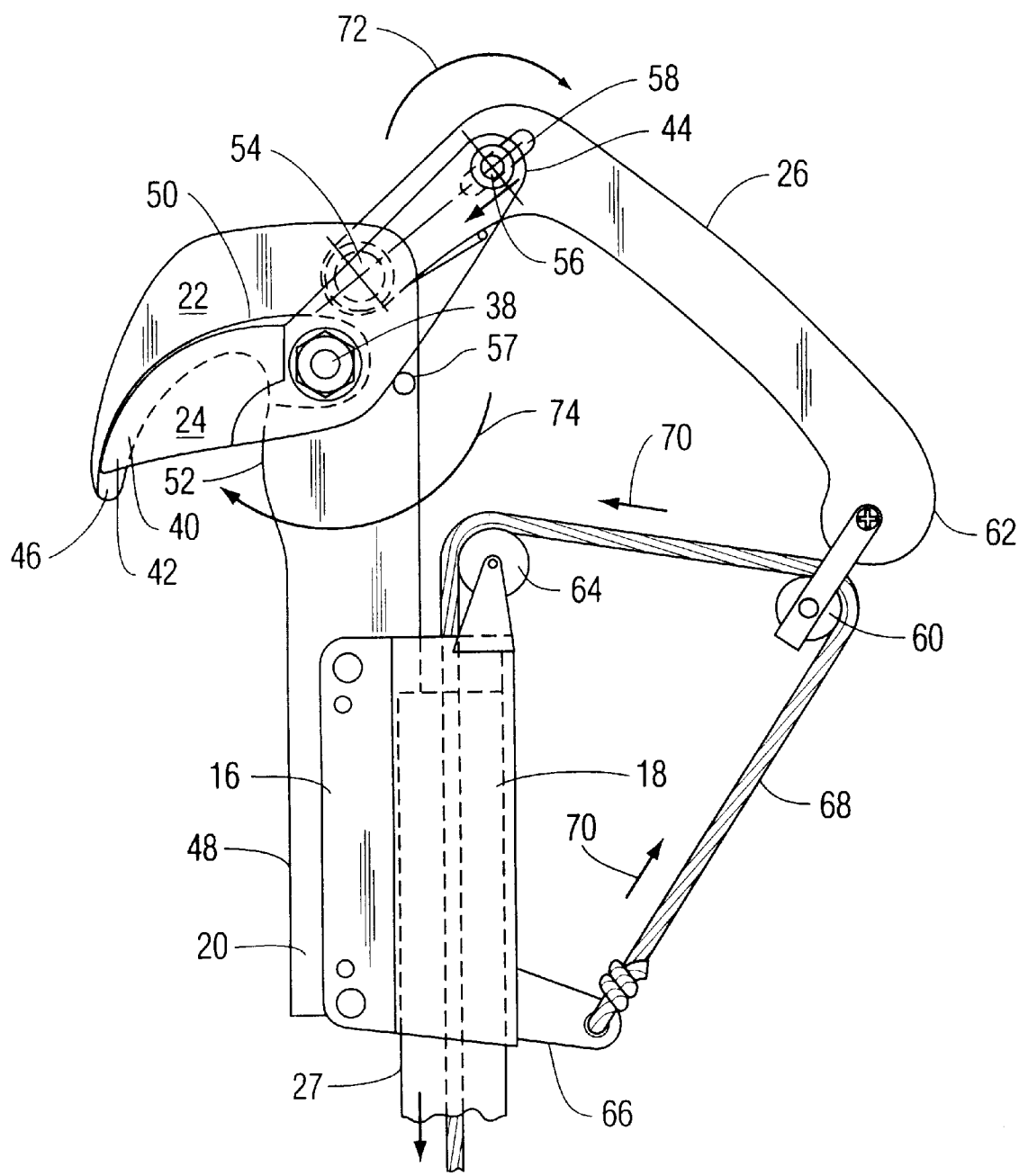
FIG. 4 is a partial plan view of the pruning shears, similar to the view of FIG. 1, showing the shearing mechanism in a fully cut position.

The shearing mechanism 14 is attached to the open upper end 28 of the hollow shaft 27. The open upper end 28 of the hollow shaft 27 is positioned within the tube 18 of the shearing mechanism 14 and held in place using appropriate fasteners or a conventionally known clamping action generated by controlled deformation of the tube 18. The hook plate 20 is firmly attached to the body 16 using an appropriate fastener 34, such as rivets or bolts. The cutting arm 24 is pivotally connected, using an appropriate bolt 36, to an upper portion of the hook plate 20 at a cutter pivot point 38 which is located adjacent to the hook 22, as seen in FIG. 1. The cutting arm 24 is pivotal between an open pre-cut position, as shown in FIG. 1, and a closed fully-cut position, as shown in FIG. 4. The cutting arm 24 is preferably held in the open position by a spring bias.

Also seen in FIGS. 1 and 4 is the cutting arm 24, which is attached to the hook plate 20 approximately at the middle of the cutting arm 24. The cutting arm 24 includes an outwardly curved cutting edge 40 which begins adjacent the middle of the blade and extends along one edge to a cutter end 42 of the cutting arm 24. Located opposite the cutter end 42 of the cutting arm 24 is a leverage end 44. The cutting arm 24 upper portion is preferably angled inwardly, e.g. above hook 22, from the cutter pivot point 38 at a prescribed angle.

The hook 22 is preferably curved downwardly, as shown in FIG. 1, and includes an inwardly curved cutting edge 46. The downwardly curved hook 22 and accessible side 48 of the body 16 defines a receiving nook 50 which is adapted to receive a limb of interest. The exact size of the receiving nook 50 is dependent on the specific application of the pruning shears, i.e., the range of limbs intended to be pruned. Regardless, the shape of the cutting edge 46 mates (with a prescribed shearing overlap) with the outwardly curved cutting edge 40 of the cutting arm 24.

Located along the accessible side 48 of the hook plate 20, and within the receiving nook 50, is an outwardly curved protrusion 52 which is adapted to outwardly force a captured limb into the cutting edge 46 of the hook 22 to assist in holding the limb in place prior to and during the shearing procedure. The protrusion 52 is aligned with and is shaped similar to the cutting edge 40 of the cutting arm 24 and further functions to effectively shield the cutting edge 40 when the cutting arm is located in the open position.

The leverage arm 26 is pivotally connected to the hook plate 20 at a leverage pivot point 54 which is adjacent to, but preferably not coaxial with the cutter pivot point 38. In accordance with the invention, the leverage pivot point 54 is located a prescribed distance from the cutter pivot point 38 and a greater distance from the receiving nook 50. A spring 55 is located at the leverage pivot point 54 and is adapted to bias the cutting arm 24 in its open position against a stop peg 57, as illustrated in FIG. 2.

The leverage end 44 of the cutting arm 24 is pivotally connected to the leverage arm 26, at a connecting point 56. The pivotal connection of the cutting arm 24 and the leverage arm 26 includes a slot 58 located within the leverage arm 26. The slot 58 is necessary to compensate for the unequal arcs of movement between the cutting arm 24 and the leverage arm 26, due to the displaced pivot points of the two arms. The leverage arm 26 is preferably outwardly angled, away from the cutting arm 24, at a prescribed angle.

A leverage pulley 60 is attached to a remote end 62 of the leverage arm 26 and aligns approximately with the longitudinal axis of the hollow shaft 27. A friction reducing guide pulley 64 is operatively attached to the body 16, adjacent to the open upper end of the tube 18. An anchor arm 66 is attached to the body 16 opposite the hook plate 20, as shown in FIG. 1.

A cable 68 positioned within the hollow shaft 27 is attached to the slidable grip portion 32 shown in FIG. 3 and extends upwardly through the tube 18 of the body 16, around the leverage pulley 60 and is anchored to the anchor arm 66.

In operation, referring to FIG. 4, the user captures a limb within the receiving nook 50. The user pulls down on the hollow shaft 27 and forces the limb against the cutting edge 46. Once the limb is positioned within the receiving nook 50, the user moves the slidable grip portion 32 with respect to the hollow shaft 27. The downward movement of the slidable grip portion 32 draws the cable 68 into the hollow shaft 27, as seen in FIGS. 3 and 6 and indicated by the arrows 70 in FIG. 4. The pulling of the cable 68 causes the leverage arm 26 to pivot about the leverage pivot point 54, as indicated by the arrow 72. The leverage pulley 60 introduces a leverage advantage to the pivoting of the leverage arm 26, as is well known in the art so that the force applied to the slidable grip portion 32 is effectively doubled in pulling down the leverage arm 26. It is important to note that one-handed operation is uniquely possible with the present invention.

As the leverage arm 26 pivots, the cutting arm 24 is forced to pivot about the cutter pivot point 38, as indicated by the arrow 74 in FIG. 4, against the spring bias from the spring 55. As soon as the leverage arm 26 and the leverage pulley 60 moves from alignment with the longitudinal axis, the cable 68 is "caught" and guided by the guide pulley 64. The resulting movement of the cutting arm 24 with respect to the hook 20 cuts the captured limb. The reversed angles (outward/inward) of the leverage arm and cutter blade bends and cooperates to increase the cutting force of blade 40.

Figure 5:
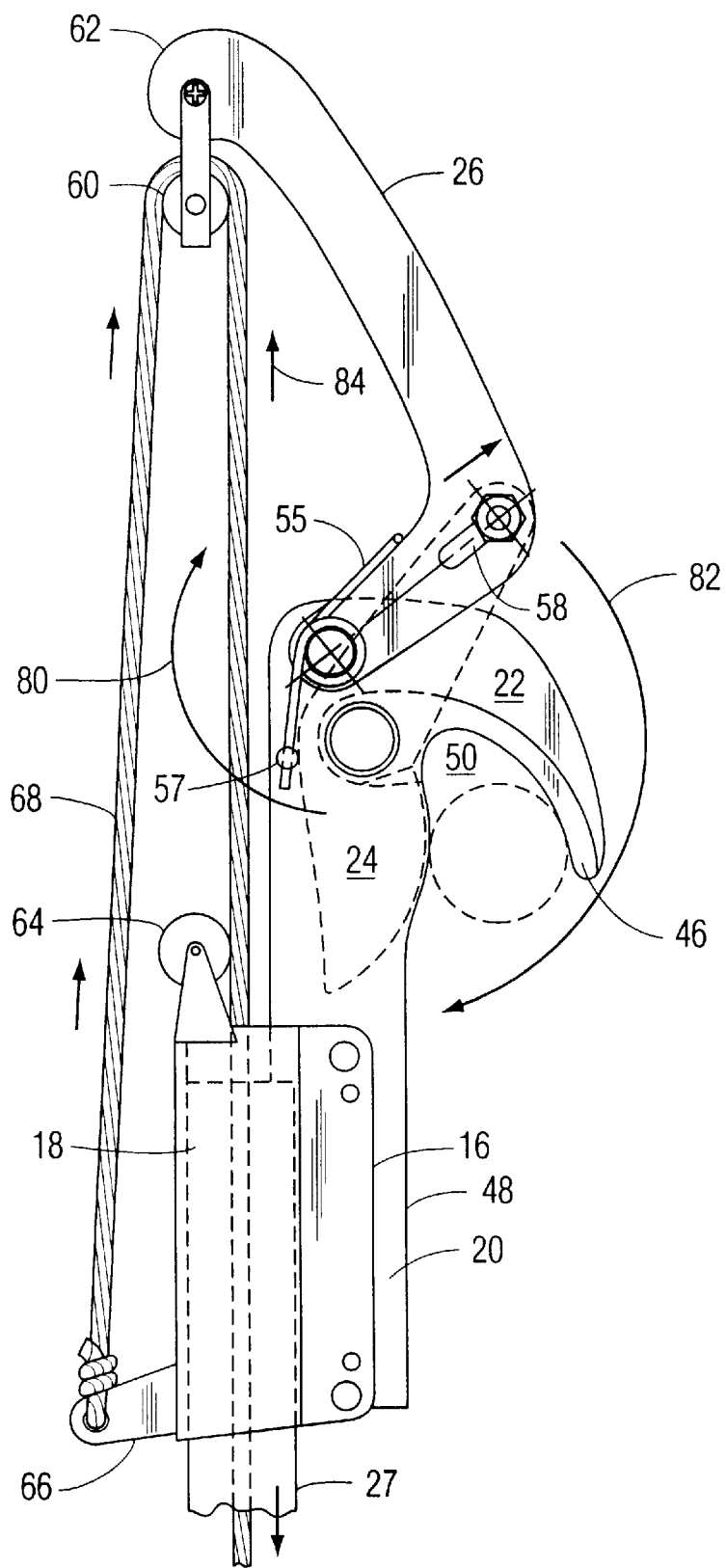
FIG. 5 is a partial rear plan view of the shearing mechanism showing the shearing mechanism in the receiving position, in accordance with the invention.

Once the limb is cut, the user releases the slidable grip portion 32. The spring 55 shown in FIG. 2 causes the cutting arm 24 to return to the open position, as indicated by the arrow 80, of FIG. 5, and the leverage arm 26 to move upwardly to its pre-cut position, as indicated by the arrow 82 in FIG. 5. The cable 68 similarly returns to its pre-cut position, as shown by the arrows 84.

Figure 7A:
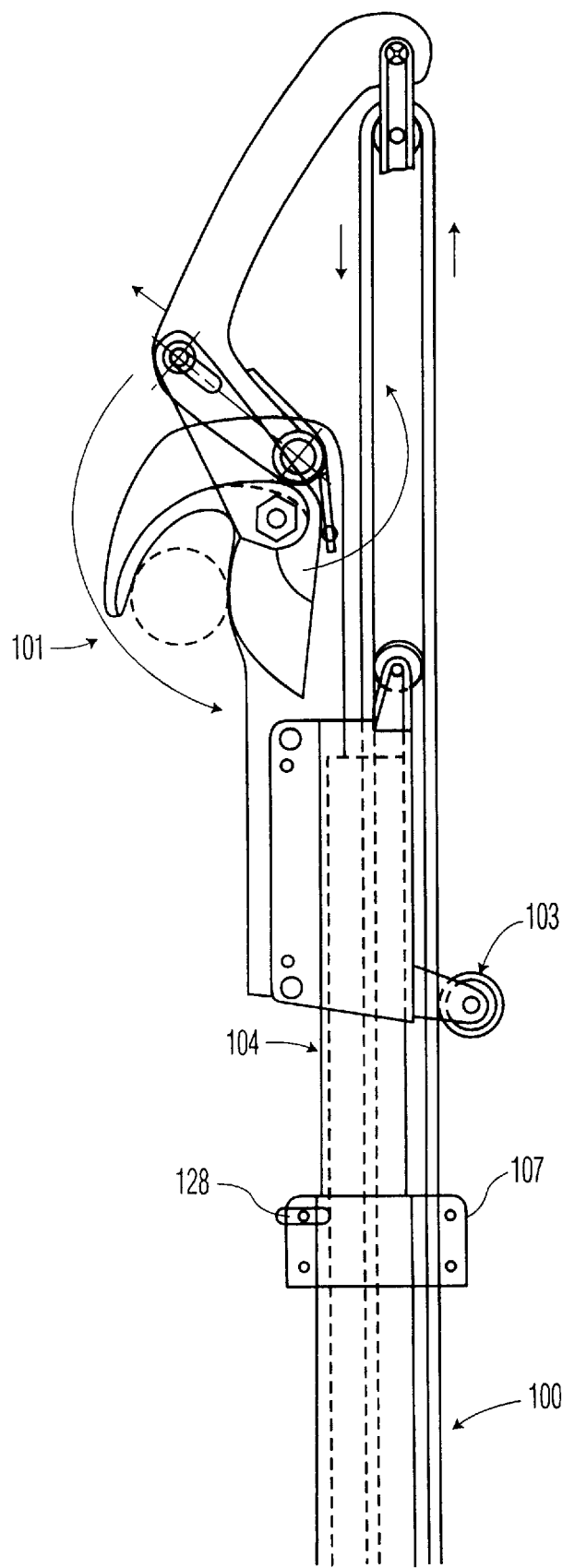
FIGS. 7A and 7B are the same as FIG. 1 showing an exemplary embodiment that is length adjustable and wherein the length is adjusted to the approximate shortest position.
Figure 7B:
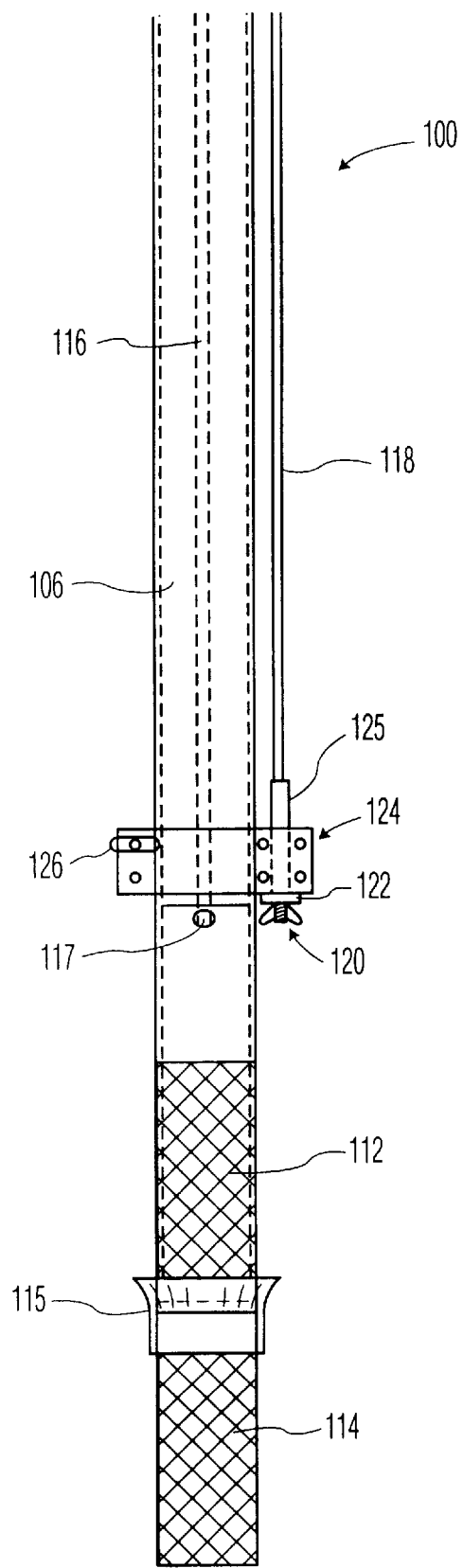
Figure 8A:
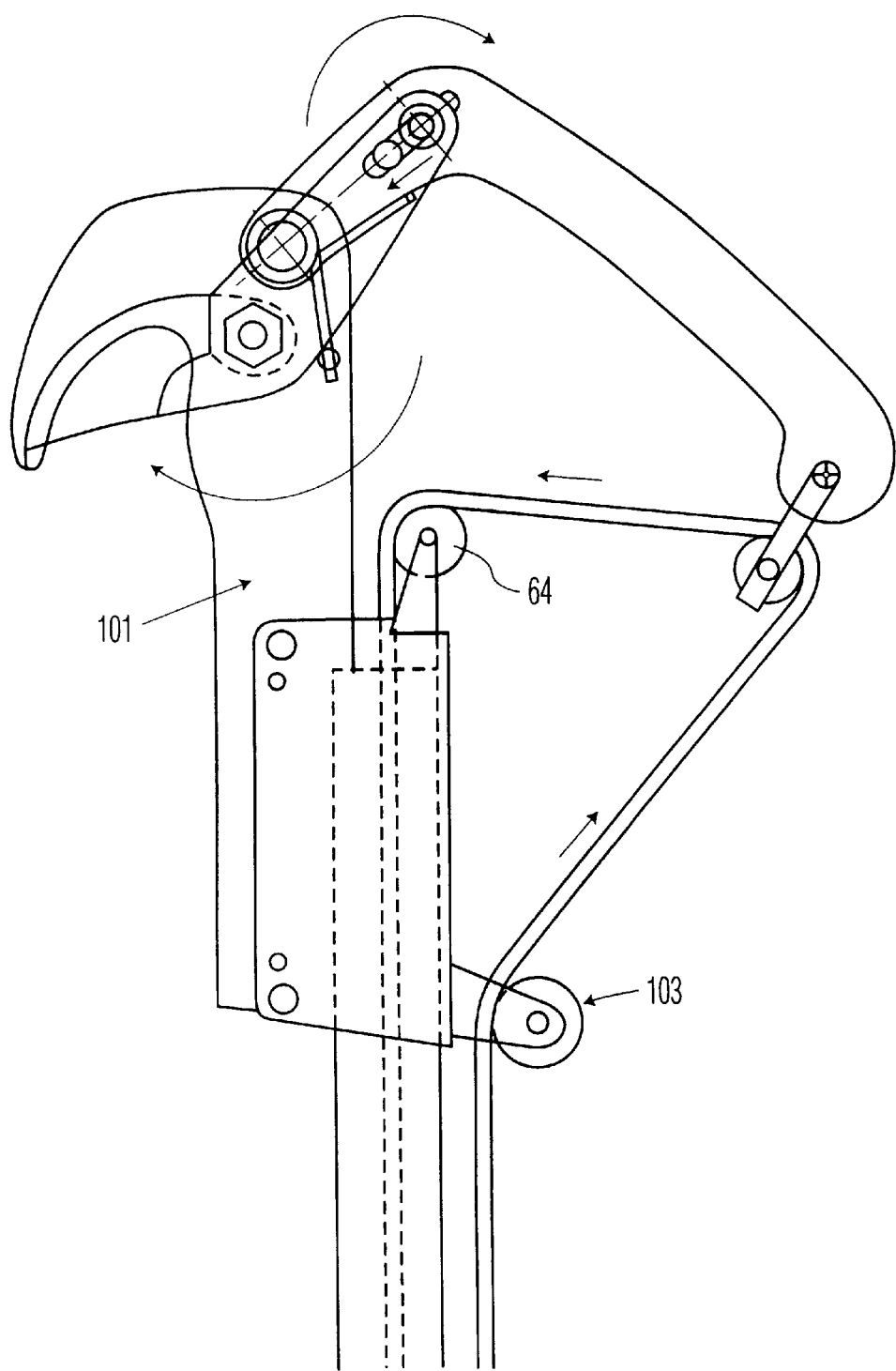
FIGS. 8A, 8B and 8C show the embodiment of FIGS. 7A and 7B adjustable to the approximate longest position and the handle withdrawn to the cut position.
Figure 8B:
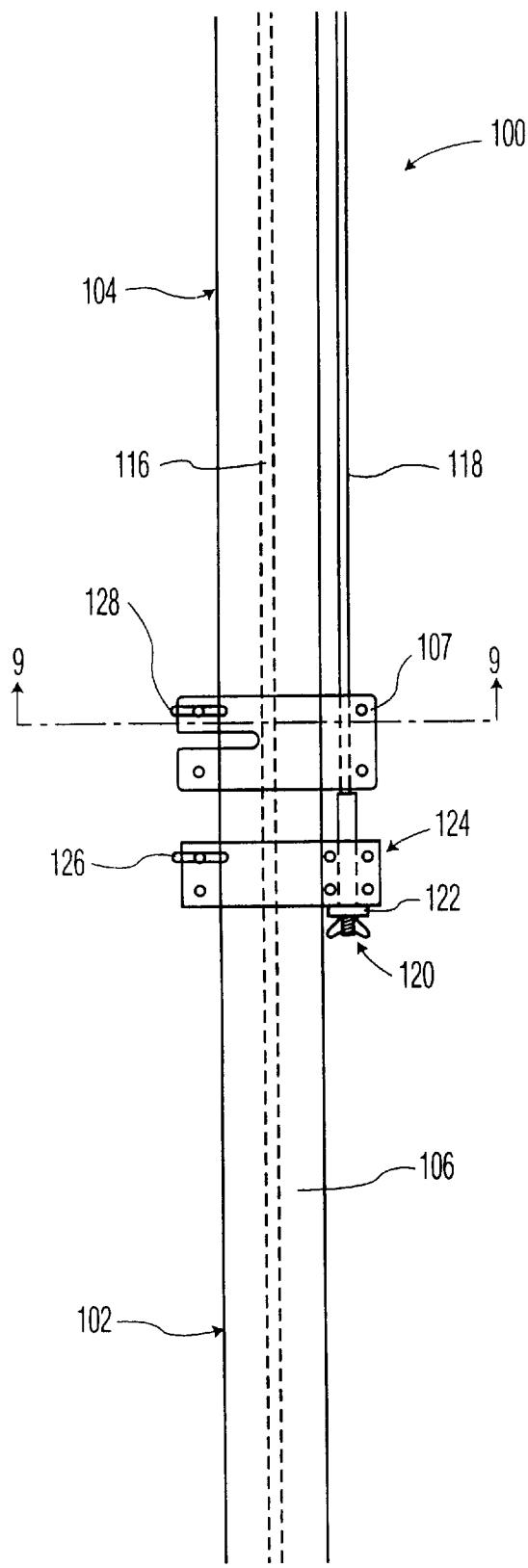
Figure 8C:
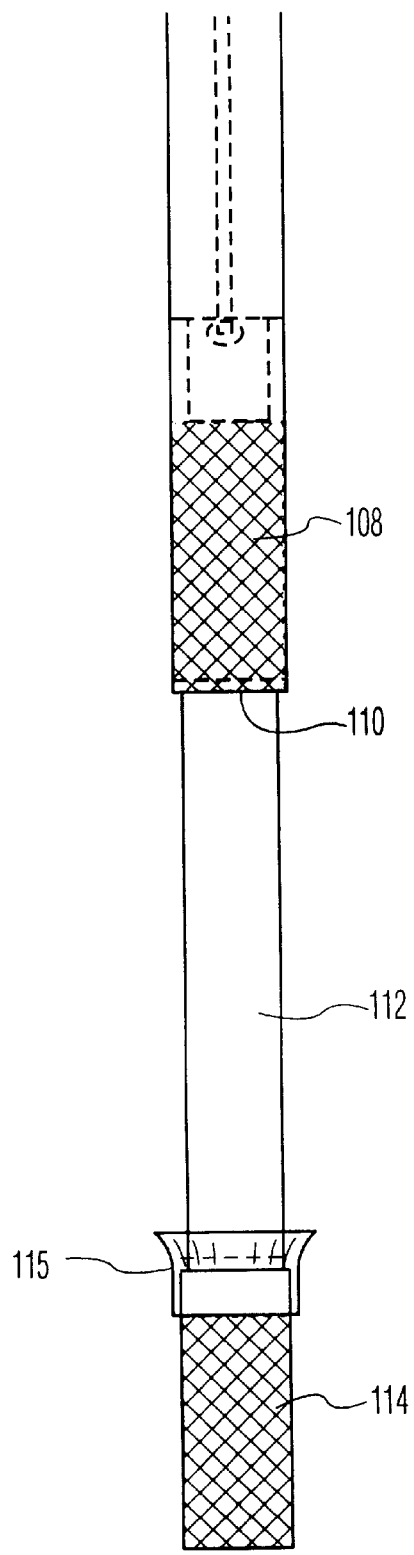
Figure 9:
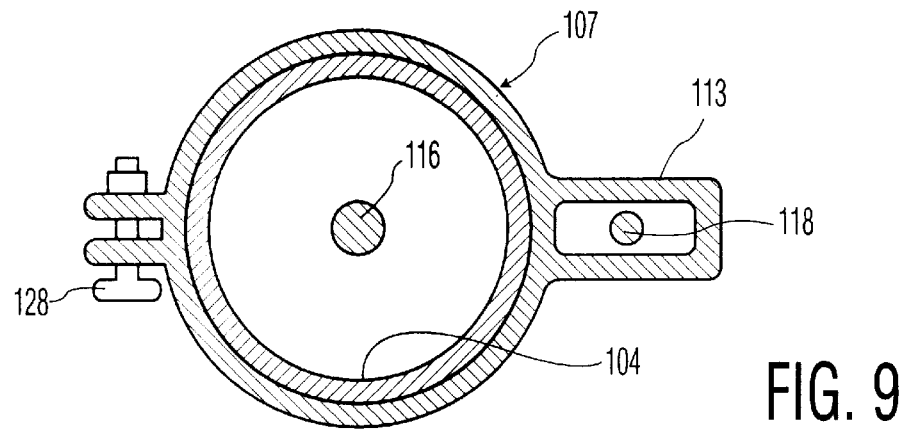
FIG. 9 is a horizontal section taken along line 9—9 of FIG. 8B.

With reference to FIGS. 7–9, there is shown an exemplary length-adjustable pruner according to the principles of the present invention. Pruner 100 includes shearing mechanism 101, the structure, function, and operation of which can be the same as described above with the addition of cable guide, pulley or roller 103. If desired, a cable guide with a rounded surface can be used instead of a pulley or roller. The handle assembly 102 includes hollow outer segment or pole 106 and a hollow inner segment or pole 104 that telescopes through the upper end of pole 106. Shearing mechanism 101 is mounted in fixed relation to the upper end of pole 104. Handle 102 further includes a sliding shaft 112 telescoping through the lower end of pole 106. Foam rubber or other suitable material hand grips 108 and 114 are secured at the lower end of pole 106 and lower end of shaft 112, respectively, to aid the user gripping integrity and manual frictional engagement with the pruner. Grip 108 includes a protecting piece 110 that overlaps the lower edge of pole 106. Hand grip 114 includes shield 115 that extends beyond the bottom of pole 106 to protect the user's upper or lower hand from being pinched when shaft 112 is moved to the pre-cutting or ready position shown in FIG. 7. Shield 115 can be made of any suitable material such as plastic, rubber, or metal. Alternatively, the shield can be mounted on the lower end of grip 112 and facing downward, if desired.

The cable includes inside cable portion 116 with, in this example, its distil end 117 connected to the upper part 117 of shaft 112 and outer cable potion 118. Handle 102 further includes a pole extension clamp 109 permanently mounted to or near the top of pole 106. The upper part of clamp 107 is dimensioned to closely but slidably fit around pole 104. Wing screw 128 enables the user to tighten or loosen the clamp for frictional engagement with or release between pole 104 and clamp 107. Upon such release, poles 104 and 106 can telescope to new overall length positions. Then wing screw 128 can be tightened to clamp poles 104 and 106 at such new length. As better seen in FIG. 9, clamp 107 can include a u-shaped outside cable guide 113, if desired.

In order to accommodate the overall length adjustment, handle 102 further includes a cable clamp 124 dimensioned slightly larger than the outside diameter of pole 106. Clamp 124 includes a wing screw or nut 126 to secure clamp 124 firmly at a suitable position to avoid unwanted slack or tension in inside cable portion 116 and/or outside cable portion 118 when shearing mechanism is in the pre-cutting condition, such as shown in FIG. 7. In this exemplary embodiment shown, the end of cable portion 118 extends through a portion of clamp 124 and washer 122. The distil end of portion 118 terminates in a threaded screw held to the cable by coupler 125 and tension wing nut 120 can be turned to fine tune the slack or tension on the cable as desired.

In operation, the operator loosens knob 128 and knob 126. Poles 106 and 104 are telescoped relative to each other to a desired overall length. The wing knobs 126 and 128 are then firmly tightened to fix the overall pruner length and the cable length. If necessary, wing nut 120 can be turned to finely adjust the tension in the cable. The pruner is then ready for use in cutting a limb as described above. After use, knobs 128 and 126 can be loosened to telescope poles 104 and 106 to the shortest overall length for storage or for use in place of a lopper.

Figure 10:
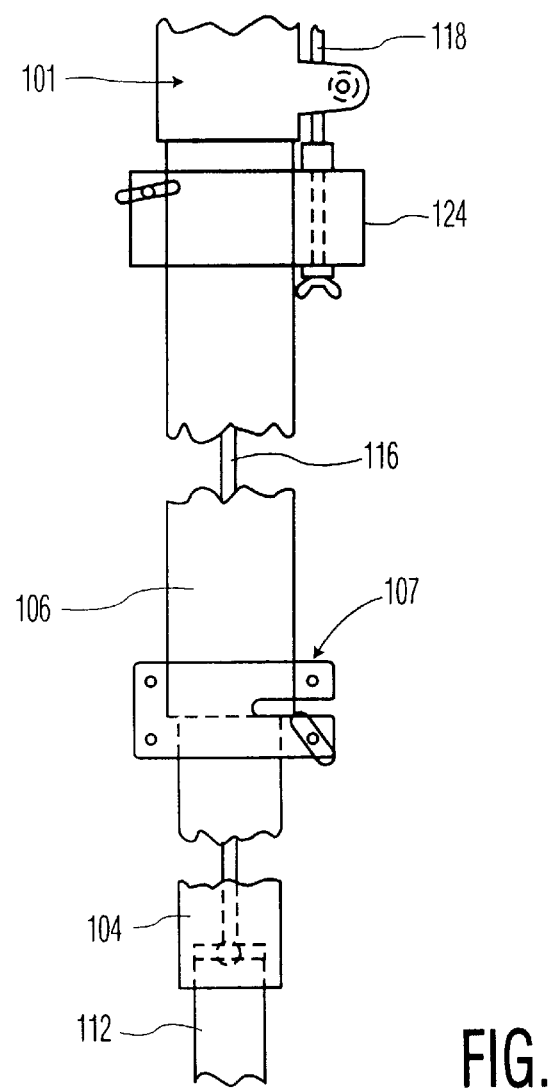
FIG. 10 is a partial view similar to FIGS. 7A and 7B showing an alternate embodiment with parts broken away.

An alternate exemplary embodiment is shown in FIG. 10 in which the inner and outer telescoping pole segments 104 and 106 are reversed so that segment 106 slides within segment 104. In this embodiment extension pole clamp 107 is reversed and fixed to the bottom of segment 106 and releasably clamped to pole segment 104. Cable clamp 124 is slidably mounted on upper pole segment 104 between a first position just above extension clamp 107 and a second position just below shearing mechanism 101, as shown. This arrangement of parts yields the benefit of shortening the length of cable needed for overall extension and operation compared to the embodiment as shown in FIGS. 7–9.

Figure 11:
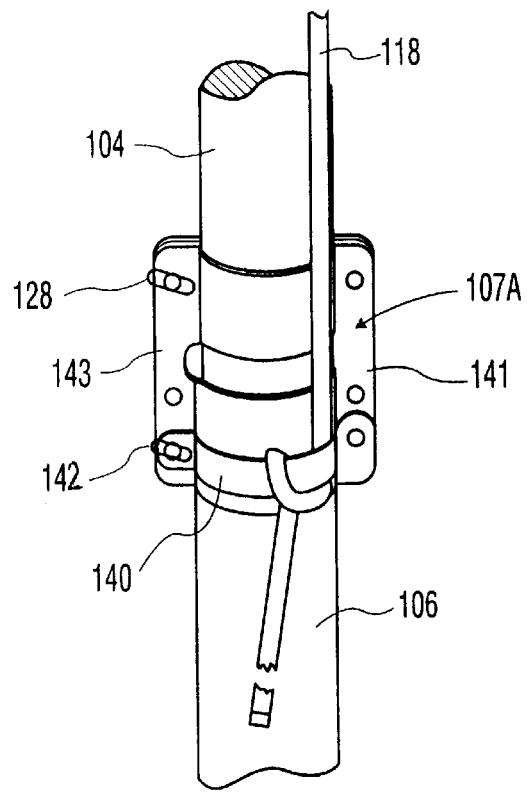
FIG. 11 is a partial view of another embodiment showing a clamp that releasably secures the pole segments and releasably secures the outer cable portion.

Yet a further exemplary embodiment is shown in FIG. 11 wherein the pole extension clamp 107A is permanently connected to the top of lower pole 106 and releasably connected to upper pole segment 104 as described for the embodiment of clamp 107 of FIGS. 7–9. Clamp 107A also includes a cable anchor or strap 140 having one end connected, for example riveted, to the wing 141 of clamp 107A and the other end releasably connected to the wing 143 clamp 107A by wing nut or screw 142. The outer cable portion 118 runs downward between strap 140 and the body of clamp 107A and, if desired, upward around strap 140 thence downward again between strap 140 and the body of clamp 107A generally as shown. Clamp 107A and strap 140 function to not only releasably clamp the telescoping segments 104 and 106 at desired lengths but also function to releasably clamp the outer cable portion 118 at various corresponding lengths to accommodate the relative positions of pole segments 104 and 106. Accordingly, the embodiment of FIG. 11 needs no separate cable clamp such as 124 in FIG. 10 and 124 in FIG. 7.

In operation, wing-nut 142 is loosened to release the clamp force between strap 140 on cable portion 118. If the pruner length is to be increased, the operator draws portion 118 upward to provide more length or slack. Wing-nut 128 is loosened and the pole segments telescopically withdrawn until the desired length is reached. Wing-nut 128 is then tightened to fix the length and portion 118 is fed or drawn downward about strap 140 until the operative length of portion 118 accommodates the newly set pruner length. With portion 118 so set, wing-nut 142 is tightened to clamp or firmly fix the cable against the body of clamp 107A.

Figure 12:
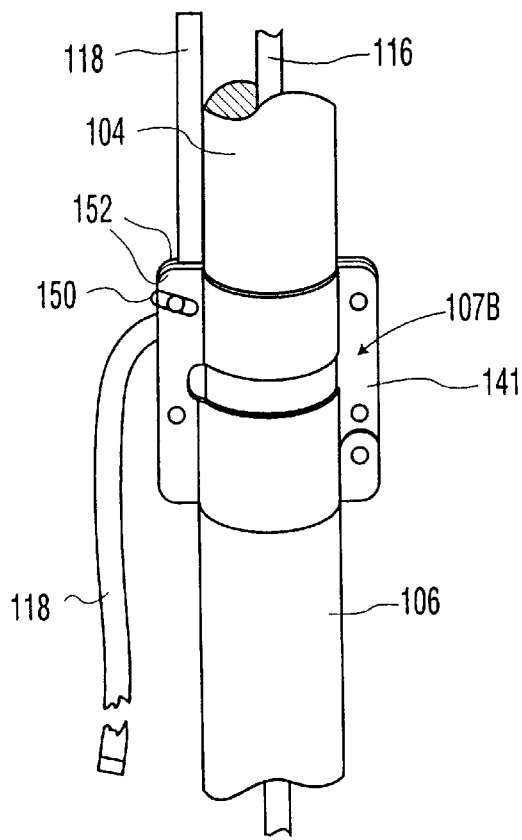
FIG. 12 is similar to FIG. 11 of yet another embodiment of the invention.

The alternate embodiment shown in FIG. 12 includes segment extension and cable clamp 107B permanently connected to the top of segment 106 and releasably clamping or securing segment 104 by operation of wing-nut or wing-screw 150. Cable portion 118 extends downward between flanges 152 and out the vertical edges thereof below wing-nut 150. Accordingly, selective operation of wing-nut 150 not only releasably secures segment 104 to clamp 107B but it also releasably clamps or secures portion 118 between flanges or wings 152. Loosening of wing nut 150 enables selecting the length of the pruner and the corresponding proper operable length of cable portion 118 above flanges 152.

It should be understood that the various parts can be made of any suitable materials and the parts are not necessarily drawn to scale. For example, poles 104 and/or 106 can be made of plastic, fiberglass, or metal. The cable can be made of metal, chain, nylon tape, nylon cord, or any other suitable materials and types. It should also be understood that the cable route shown is exemplary but is preferred since it yields benefits such as simplicity in design, increased reliability, ease of use in tight limb environments, and two-hands on the handle 114, if desired.

Other and further changes and modifications can be made to the herein disclosed embodiments without departing from the spirit and scope of the present invention.

We claim:

1. A pruner assembly for cutting limbs, said pruner assembly comprising:

a hollow shaft having a longitudinal axis, a lower end, and an open upper end, and a slidable grip portion, said slidable grip portion being slidable along said longitudinal axis between a first position and a second position;

a shearing mechanism attached to said open upper end of said hollow shaft, said shearing mechanism including a body having a hook adapted to receive and hold a limb, a cutting blade pivotally attached to said body and selectively pivotable against said hook to cut said limb;

an arm member pivotally connected to said body, said cutting blade being coupled to a portion of said arm member so that pivotal movement of said arm member pivotally moves said cutting blade;

a pulley mounted to said arm member; and a cable guide member coupled to the hollow shaft adjacent the open upper end and having a friction reducing surface located to guide a cable into and out of said open upper end;

a cable for moving said cutting blade with respect to said hook, said cable extending in operable engagement with said pulley and said guide member friction reducing surface, through said open upper end, through said hollow shaft and being coupled to said slidable grip portion, wherein movement of said slidable grip portion between said first and said second positions rotates said arm member and said cutting blade with respect to said hook.

2. A pruner assembly according to claim 1, wherein said cable extends directly between said pulley and said guide member.

3. A pruner assembly according to claim 1, wherein said guide member comprises a guide pulley.

4. A pruner assembly according to claim 3, wherein said guide pulley is located to guide said cable into and out of said open upper end such that said cable remains spaced from the walls of said open upper end.

5. A pruner assembly according to claim 4, wherein said cable contacts a greater or lesser portion of the circumference of said guide pulley in relation to the degree of rotation of said arm member.

6. A pruner assembly according to claim 4, wherein said pulley and said guide pulley function as a two-pulley system to reduce the force needed to pull the cable when the blade is cutting a limb.

7. A pruner assembly according to claim 3, wherein said cable extends directly between said pulley and said guide pulley, and said cable rotates said pulleys in response to movement of said slidable grip portion.

8. A pruner assembly according to claim 1, wherein said hollow shaft comprises an upper segment and a lower segment, said segments being in telescopic engagement with each other, a segment securing device releasably securing said segments at a number of relative positions that contribute to the selected length of said pruner assembly.

9. A pruner assembly according to claim 8, wherein a cable device is mounted to one of said segments and selectively engaging a cable portion for increasing or decreasing the operable length of said cable portion in relation to the decrease or increase in length of said pruner assembly.

10. A pruner assembly according to claim 8, wherein said guide member comprises a guide pulley.

11. A pruner assembly according to claim 10, wherein said guide pulley is located to guide said cable into and out of said open upper end such that said cable remains spaced from the walls of said open upper end.

12. A pruner assembly according to claim 11, wherein said cable contacts a greater or lesser portion of the circumference of said guide pulley in relation to the degree of rotation of said arm member.

13. A pruner assembly according to claim 11, wherein said pulley and said guide pulley function as a two-pulley system to reduce the force needed to pull the cable when the blade is cutting a limb.

14. A pruner assembly according to claim 1, wherein said pulley is mounted near the end of the arm member opposite from the location where the arm member is pivoted to said body.

15. A pruner assembly according to claim 1, wherein said hollow shaft is of fixed length.

16. A pruner assembly according to claim 1, wherein a spring biases said arm member and said cutting blade to a position enabling the hook to receive and hold a limb.

* * * * *

Disclaimer 6,178,644—Thong Huu Le; Timothy Van Le, both of San Jose, CA. HOLLOW SHAFT PRUNING ASSEMBLY. Patent dated January 30, 2001. Disclaimer filed January 24, 2001, by the assignee, Thong Huu Le.

The term of this patent shall not extend beyond the expiration date of Pat. No. 5,745,998.
*(Official Gazette, June 12, 2001)*